United States Patent Office 2,923,001
Patented Jan. 26, 1960

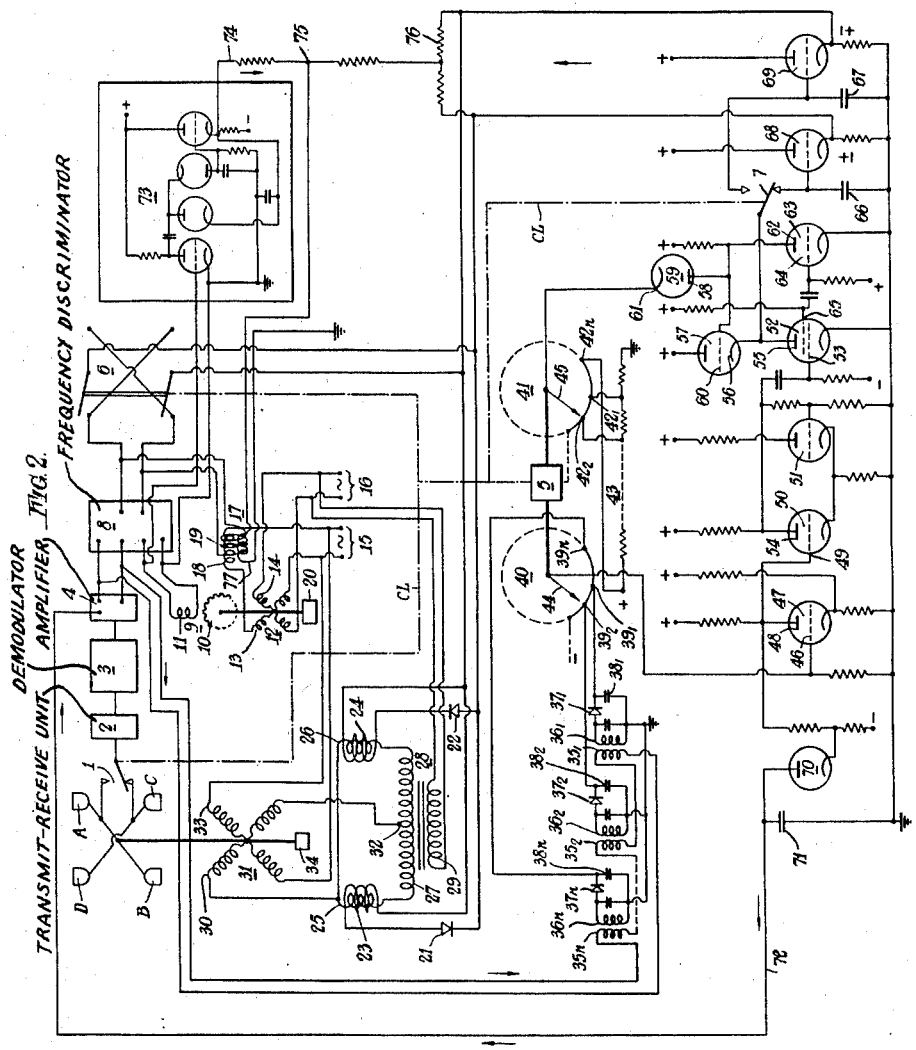

2,923,001

INDICATORS FOR AIRCRAFT DRIFT, GROUND SPEED AND DISTANCE RUN

Mervyn Morgan, Chelmsford, and William Oliver Agar, Danbury, England, assignors to Marconi's Wireless Telegraph Company Limited, London, England, a British company Application October 26, 1954, Serial No. 464,668

Claims priority, application Great Britain November 6, 1953

9 Claims. (Cl. 343—9)

This invention relates to indicators of the kind in which an aerial system comprising a plurality of differently directed aerials, which are orientatable as a unit with respect to aircraft heading, is employed to obtain indications of drift and/or ground speed or distance run or any combination of these three, the aerial system consisting of two portions each adapted to transmit and receive very high frequency waves in different directions, means being provided for cyclically bringing said portions alternatively into operation for pre-determined periods of time. There are means for detecting Doppler frequencies produced by the different aerials of the system due to aircraft movement, and such frequencies are then employed for controlling the orientation of the aerial system to provide a drift indication or for varying the frequency of a reference frequency source to provide an indication of aircraft speed or distance run or both.

In indicators of this kind, there may be a four aerial system including two alternately operating pairs of aerials, one pair transmitting and receiving forwards and downwards to port and backwards and downwards to starboard, and the other pair transmitting and receiving forwards and downwards to starboard and backwards and downwards to port. The aerial system ascertains drift, ground speed and distance run by comparing the Doppler frequency shifts (difference between transmitted and received echo frequencies due to aircraft motion) of the two aerial pairs, orientating the system until the two shifts are the same (this gives drift) and then measuring the now common Doppler frequency (this gives ground speed). By orientating the system until the two Doppler frequencies are the same and then measuring the adjusted angle between aerial system orientation and aircraft head, drift is ascertained since the angle between aircraft head and the system orientation is the drift angle and, in this connection, the adjustment to obtain the common Doppler frequency is a direct function of aircraft speed and can be combined with time to give distance run.

It is desirable to make an indicator automatic in operation so that the indicator will automatically orientate its own aerial system until the two Doppler frequencies are the same or so that it will always automatically give ground speed or distance run or both. Self-orientation can be effected by using a sensitive frequency discriminator circuit, responsive to the sense and magnitude of the difference between the two Doppler frequencies, to produce a D.C. voltage, of polarity and value corresponding to said sense and magnitude, and employing said D.C. voltage to orientate the aerial system until the difference between the Doppler frequencies is substantially zero. The difficulty is that the discriminator circuit must obviously be sensitive and such sensitive discriminator circuits will only operate over a limited range of frequency differences. If, therefore, the aerial system is well away from the "on track" orientation, the discriminator circuit will not take charge at all and the aerial system must be brought near the "on track" setting, for example by hand before the automatic orientation arrangement will take over. An important object of the invention is to avoid this defect and to produce fully automatic orientation by comparatively simple and robust apparatus. The invention is then concerned with the problem of providing what may be called a coarse self orientating system, not precise enough for drift indication but good enough to orientate the aerial system into a position in which the main precise system can take charge.

A similar difficulty arises in connection with the ground speed and distance run measuring part of the apparatus. Usually the mean of the two Dopler frequencies produced, this is the same as each of them when the aerial is properly tracked, is compared with the frequency of a motor driven reference generator and speed ascertained by measuring the generator speed. To obtain automatic speed indication, the speed of the motor is controlled by the output from a frequency discriminator which compares the generator frequency with the mean Dopler frequency and adjusts the speed of the motor in dependence on the discriminator output to make the generated frequency the same as the mean Dopler frequency. When this has been done, the motor speed is a function of aircraft speed over the ground. Again this discriminator must be sensitive and therefore has a limited range over which it can take charge and if, at any time, the generated frequency happens to be widely different from the mean Dopler frequency it is necessary, in a known arrangement, to adjust the motor speed by hand to bring it near enough to the correct value for the discriminator to take charge. Another important object of the invention is to avoid this, and accordingly the invention is concerned with the problem of providing a coarse automatic control of the frequency of the reference generator to bring it near the mean Doppler frequency.

Preferably, automatic coarse adjustment both of aerial orientation and reference generator frequency should be provided, for only then can really full automatic operation be obtained. There are, however, substantial advantages over known practice in providing either of these coarse adjustments alone, especially that of reference generator frequency.

According to the present invention there is provided an aircraft navigational aid of the kind set forth, and further comprising a set of resonators resonant to different closely spaced frequencies within and covering the expected band of Doppler frequencies, means for feeding to said set of resonators the Doppler frequencies from said two portions of the aerial system in turn, means for successively sampling the outputs from the resonators of the set during each period when an aerial portion is operative, means for producing, simultaneously with the taking of each sample, a different pre-determined D.C. voltage allotted to and characteristic of the resonator being sampled, means responsive to an output of a pre-determined minimum value from any resonator of the set for supplying the pre-determined D.C. voltage simultaneously produced to one or other of two voltage storage circuits, one of which is connected to receive the D.C. voltage in alternate periods, and the other of which is connected to receive the D.C. voltage during the remaining periods, and means responsive to the stored voltages in said storage circuit for orientating the aerial system or for varying the frequency of a reference frequency source the frequency of which is a function of aircraft speed or both.

For producing automatic coarse adjustment of orientation of the aerial system the difference between the stored voltages in the storage circuits may be employed to control rotation of an electric motor mechanically connected to orient said system so as to orient the same towards a position in which said difference becomes zero.

For producing automatic coarse adjustment of a reference frequency generator for speed and distance run indication the frequency produced by said generator is fed to a frequency meter adapted to produce a D.C. output proportional to said frequency and this D.C. output is compared with the mean of the stored voltages in the storage circuits to produce a resultant which is employed to control the speed of an electric motor driving said generator.

The differential output from the storage circuits control the same self-orientating circuit which is operated by the known, more limited, orientating system.

Preferably, there is employed a pair of synchronously driven distributor switches, one of which explores the resonators and the other of which explores the tappings of a potential divider, output from the first switch being used to complete a circuit which, in effect, supplies output from the second to a point which is alternately connected, in successive periods, to one or other of two storage condensers.

For a better understanding of the invention and to show how the same may be carried into effect, reference will now be made to the accompanying drawings in which:

Fig. 2 is a schematic diagram of a practical arrangement of an indicator.

Figure 1:
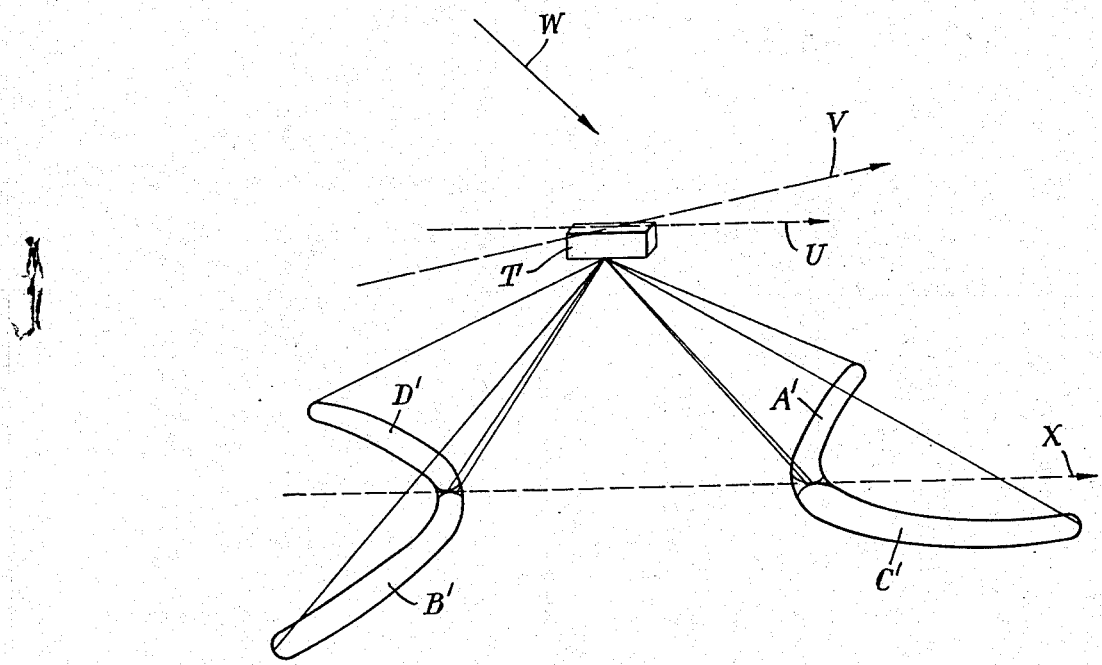
Fig. 1 is a schematic arrangement of a four aerial unit.

Referring to Fig. 1, T represents a four aerial unit containing aerials A, B, C, D which may be regarded as being installed in an aircraft. The arrow V passing through the unit T represents the direction of the aircraft heading, whilst the arrow U indicates the direction of orientation of the four aerial unit. The direction of the wind with respect to the aircraft is indicated by arrow W. The aircraft is regarded as moving along a true track, the direction of which is shown by the arrow X.

In practice, the aerials, which are, of course, very high frequency directional aerials, consist of dipoles with associated reflectors or the equivalent thereof. The radiations from each of the four aerials are shown in Fig. 1 as areas of curved outline A', B', C', D'. As the aerials have directional properties the radiations therefrom are confined to beams which diverge, whilst having an elongated arcuate shape in section. The four aerials are grouped in pairs, that is, aerials A and B as one pair and aerials C and D as the other pair. The pairs of aerials radiate alternately. The direction of the radiations from each of the aerials shown in Fig. 1 is as follows:

Aerial A, downwardly and forwardly to the port side of the direction of true track X (area A' in the figure), and Aerial D, downwardly and rearwardly to the port side of the track X (area D' in the figure).

Referring to Fig. 2, the orientatable aerial system consists of two pairs of aerials, represented by reflectors A, B, C and D, the aerials emitting signals in the manner indicated in Fig. 1. A switch 1 alternately connects, for predetermined equal time periods, the two pairs of aerials to a normal transmit-receive unit 2. The latter is followed by a receiver demodulator 3, the output of which consists of Doppler frequencies and which output is fed to a Doppler frequency amplifier 4. The amplifier 4 is a low frequency amplifier capable of handling any Doppler frequency within the expected range. The switch 1 is operated by a motor 5 which also synchronously operates two other switches 6, 7, the switch to motor connections being indicated schematically by chain lines CL. Output from the amplifier 4 is fed to one input of a sensitive frequency discriminator 8 of any known form, whose second input is a reference frequency derived from a generator 9 of controlled frequency. The generator is shown as a motor driven toothed iron wheel 10 with an associated pick-up coil 11. This is a well known form of generator usually called a phonic wheel generator. The driving motor is a two-phase motor 12 and is represented by its two phase windings 13, 14. Since the input to the discriminator 8 consists of the Doppler frequencies from the two pairs of aerials, it will compare the means of these frequencies with the phonic wheel frequency and will give a D.C. output of polarity and value dependent on the sense and magnitude of any difference therebetween. One phase 13 of motor 12 is fed from any suitable source 15 of A.C., whilst the other phase 14 is fed from a source 16 of A.C. which is shifted in phase by $\mp 90°$ with respect to the source 15. One of the A.C. supply leads includes a variable saturable reactor 17, consisting of a ferromagnetically cored coil 18 and a saturation controlling coil 19. By varying the D.C. in the coil 19 the speed of the motor 12 can be controlled. The D.C. for the coil 19 is derived from the output from the discriminator 8. The speed of the motor 12 is thus automatically varied to maintain the frequency from the generator coil 11 equal to the mean of the two output frequencies from the discriminator 8, and therefore the speed of the motor 12 will be proportional to aircraft speed over the ground and the number of revolutions of the motor will be proportional to distance made good over the ground. A speed indicator and counter 20 is arranged to be driven by the motor 12, the counter being calibrated in knots or miles run, as may be required.

Output from the discriminator 8 also goes through the reversing switch 6 which is driven by the motor 5, and thence through oppositely poled rectifiers 21, 22 each in series with the saturation controlling coils 23, 24 of two further variable saturable reactors whose main coils are shown at 25, 26 respectively. One end of each of the coils 25, 26 is connected to the opposite ends of the centre-tapped secondary winding 27 of a transformer 28 whose primary winding 29 is fed from the A.C. supply 16, the remaining ends of the coils 25, 26 being connected together and to one end of one phase winding 30 of another two phase motor 31, the other end of this phase winding being returned to the centre tap 32 on the secondary winding 27. The other phase winding 33 of the motor 31 is energized from the other A.C. supply 15. The motor 31 orientates the aerial system, and will rotate in the appropriate direction until the two frequencies alternately fed to discriminator 8 from amplifier 4 are equal. A pointer or other indicator 34 on the shaft of motor 31 reads the angle between aerial system orientation and aircraft head, and therefore reads drift since the motor 31 will automatically orientate the aerial system to the "on track" position.

As so far described the system does not include the present invention. One weakness is that if the aerial system is well off track, the discriminator 8, which must be sensitive and therefore has a very limited frequency range of operation, will not take charge at all, and, for the arrangement to work, other means (hitherto usually manual) must be provided to bring the aerial system nearly to the "on track" position. The invention provides automatic means, now to be described, for doing this. Another weakness is that if at any time the frequency produced by the phonic wheel generator 9 is well off the correct frequency or the speed at which the aircraft is flying, the discriminator 8 is again unable to take charge. Figure 2 incorporates apparatus for dealing with this weakness also.

Output from the amplifier 4 is fed to a number of series connected coils $35_1, 35_2 \ldots 35_n$ (only three of which are shown). Each coil is coupled to a different resonant circuit $36_1, 36_2 \ldots 36_n$. These circuits are tuned to adjacent different frequencies spaced in the Doppler spectrum to be expected and each has its own rectifier $37_1, 37_2 \ldots 37_n$ feeding into condenser $38_1, 38_2 \ldots$ or $38_n$. The rectifier-condenser junctions are connected to different contacts $39_1, 39_2 \ldots 39_n$ of a distributor switch 40. The switch 40 is synchronously driven, by the motor 5, with a similar switch 41 having contacts $42_1$, $42_2 \ldots 42_n$. These contacts are connected to different points on a potentiometer 43 so that, whenever the brush 44 of switch 40 is on a contact of that switch the brush 45 is on the corresponding contact of switch 41 and therefore receives a pre-determined D.C. voltage allocated to, and characteristic of, the frequency of the resonator to which brush 44 is connected. The switches 40, 41, 1, 6 and 7 are driven by motor 5 through gearing (not shown) such that, after each revolution of the former two switches, the latter three change positions.

The brush 44 is connected to the grid 46 of a valve 47 which is normally cut off but, if the brush is on a contact connected to a resonator whose frequency is substantially the same as an incoming Doppler frequency from the low frequency amplifier 4, that resonator will supply, through its rectifier, a positive voltage which is fed to the grid of valve 47 and renders the valve 47 conductive. The anode 48 of valve 47 is connected to the control grid 49 of the first valve 50 of a pair of valves 50, 51 interconnected so as to form the well known trigger circuit shown in the figure, in which trigger circuit the valve 50 is normally conductive and the valve 51 is normally cut off. If the valve 47 becomes conductive the trigger circuit operates, that is the valve 50 cuts off and the valve 51 becomes conductive. This renders conductive a normally cut off valve 52 whose control grid 53 is capacity coupled to the anode 54 of the valve 51. The anode 55 of the valve 52 is connected to the cathode 56 of a valve 57 connected as shown to act as a cathode follower with respect to the voltage produced at the anode 58 of a diode 59, which anode 58 is connected to the grid 60 of the valve 57. The diode 59 has its cathode 61 connected to the brush 45. The anode 58 is also connected to the anode 62 of a normally conductive valve 63, the control grid 64 of which is capacity coupled to the screen grid 65 of the valve 52. The cathode of valve 57 is connected through the switch 7 either to a storage condenser 66 or a storage condenser 67, the former during alternate revolutions of switches 40 and 41 and the latter during remaining revolutions. The stored voltages in condensers 66, 67 are amplified by valves 68, 69 and are then fed in parallel to the output from the switch 6 so that, even though the discriminator 8 is not within its operating range, the motor 31 is subjected to automatic orientating control.

In operation, if a positive signal from the brush 44 to the valve 47 exceeds a pre-determined value set by the parameters of the circuit, the trigger circuit operates, valve 53 conducts and valve 63 is cut off, thus permitting the anode of diode 59 to rise to substantially the same voltage as its cathode, which is the voltage then being supplied from potentiometer 43 via brush 45. The cathode follower valve 57 also rises to substantially the same voltage. This voltage is fed to the condenser 66 or the condenser 67, depending on the position of the switch 7, say condenser 66. If during the next revolution of switches 40 and 41 the trigger is operated at the same point in the revolution, this will happen only if the incoming Doppler frequencies are substantially the same, the same voltage will be fed to the other condenser 67 and the voltages at the cathodes of valves 68, 69 (which are provided only to give low impedance output voltage sources) will be the same. If, however, the incoming Doppler frequencies are different, the voltage fed to the condenser 66 will occur at a different point in the revolution and therefore be of different value from that fed to condenser 67. This voltage difference is used to rotate the motor 31 one way or the other, depending on its sign, until the aerial system is near enough to the "on track" position for the discriminator 8 to take over.

Valve 70 is not an essential part of the circuit. It is simply an ordinary automatic gain control diode, feeding into the usual reservoir condenser 71 and providing an automatic gain control potential over a lead 72 to the amplifier 4 to control the gain thereof to a pre-determined level in accordance with usual practice.

For simplicity the switches are schematically shown as mechanical switches. They may, of course, be of any suitable kind including electronic switches. For example, switch 1 would normally be a wave guide switch.

So far only the coarse self-orientating apparatus has been described. To produce automatic coarse control of the speed of the motor 12 driving phonic wheel generator 9, the frequency produced by the pick-up coil 11 of the generator is fed to a frequency metering circuit 73 of any well known form such as that shown. The frequency metering circuit 73 provides a D.C. output in a lead 74 which is dependent on the input frequency fed thereto. This output is fed to a point 75, to which is also fed the differential resultant of the voltage outputs from the valves 68 and 69. As shown, the cathodes of these valves are taken to opposite ends of a resistance 76, the mid-point of which is also led to the point 75. The arrangement is such that when the phonic wheel frequency is correct, i.e. equal to the mean of the two Doppler frequencies alternately fed into the set of resonators $36_1$, $36_2 \ldots 36_n$, the voltages fed to the point 75 from the unit 73 and resistance 76 are equal and opposite. The net resultant voltage produced at point 75 is fed to a second saturation controlling coil 77 forming part of the variably saturable reactor 18, 19, 77 is the circuit of the motor 13 so that, even though the discriminator 8 is not providing an output to control the motor 8 by coil 18, coil 77 controls it towards a speed nearly enough correct for the discriminator to take charge.

We claim:

1. An aircraft navigational aid of the kind including an orientatable aerial system having two differently directed portions, means for alternately bringing said portions into operation for predetermined periods of time, means fed from said differently directed portions for detecting Doppler frequencies and means responsive to said detected Doppler frequencies for orientating said aerial system, said means comprising a set of resonators resonant to different closely spaced frequencies within and covering the expected band of Doppler frequencies, means for feeding said detected Doppler frequencies to said set of resonators, means for successively sampling the outputs from the resonators of the set during each of said periods, means for producing, simultaneously with the taking of each sample, a different predetermined D.C. voltage allotted to and characteristic of the resonator being sampled, two voltage storage circuits, means responsive to an output of a predetermined minimum voltage value from any resonator of the set for supplying the predetermined D.C. voltage simultaneously produced, to one or the other of said voltage storage circuits, one of which is connected to receive the D.C. voltage in alternate ones of said periods, and the other of which is connected to receive the D.C. voltage during the remaining ones of said periods, and means responsive to the stored voltages in said storage circuits for orientating the aerial system.

2. A navigational aid as set forth in claim 1 wherein an electric motor is provided for orientating said aerial system, and electromagnetic means for controlling a supply of current to said motor, and wherein said means responsive to the stored voltages for orientating said aerial system comprises means for applying said stored voltages to said electromagnetic means.

3. A navigational aid as set forth in claim 1 wherein the means for successively sampling the output of said set of resonators comprises a first distributor switch having a number of contacts, each contact of which is connected to the output of only one of said resonators and wherein the means for producing a different predetermined D.C. voltage with the taking of each sample, comprises a second distributor switch, a potential divider, tappings on said potential divider in the contact path of said second distributor switch and means connecting the output from the first switch to said means responsive to an output of predetermined minimum voltage value.

4. A navigational aid as set forth in claim 1 wherein said set of resonators comprises a plurality of series connected coils which are connected to said means for feeding said detected Doppler frequencies, a plurality of resonant circuits corresponding in number to the series connected coils, each of said circuits being individually connected with one of said coils and each tuned to a different frequency lying within said expected band, separate rectifying means for each resonant circuit and fed therefrom and separate condensers for each resonant circuit and fed from said rectifying means, the arrangement being such that the junction of each rectifying means and its associated condenser forms the output of its resonator.

5. A navigational aid as set forth in claim 1 wherein each of said storage circuits includes a condenser and an amplifier fed from said condenser, the outputs of the amplifiers being connected in parallel to said means responsive to the difference between the stored voltages.

6. An aircraft navigational aid of the kind including an aerial system having two differently directed portions, means for alternately bringing said portions into operation for predetermined periods of time, means fed from said differently directed portions for detecting Doppler frequencies, a reference frequency source, means responsive to the detected Doppler frequencies for controlling the frequency of said source, said means comprising a set of resonators resonant to different closely spaced frequencies within and covering the expected band of Doppler frequencies, means for feeding said detected Doppler frequencies to said set of resonators, means for successively sampling the outputs from the resonators of the set during each of said periods, means for producing, simultaneously with the taking of each sample, a different predetermined D.C. voltage allotted to and characteristic of the resonator being sampled, two voltage storage circuits, means responsive to an output of a predetermined minimum value from any resonator of the set for supplying the predetermined D.C. voltage simultaneously produced, to one or the other of said voltage storage circuits, one of which is connected to receive the D.C. voltage in alternate ones of said periods, and the other of which is connected to receive the D.C. voltage during the remaining ones of said periods, and means responsive to the stored voltages in said storage circuits for varying the frequency of said reference frequency source.

7. An aircraft navigational aid as set forth in claim 6 wherein an electric motor having an electromagnetic speed control means is arranged to drive said reference frequency source, a frequency metering unit, fed from said reference frequency source, and adapted to produce a D.C. voltage output which is dependent on the frequency of said source, means connected with said frequency metering unit and said voltage storage circuits for comparing said D.C. voltage output with the stored D.C. voltages in said storage circuits so as to produce a resultant D.C. voltage, and means for applying said resultant D.C. voltage to said electromagnetic speed control means in such manner as to control the speed of said motor in dependence thereon.

8. A navigational aid as set forth in claim 6 wherein the means for successively sampling the output of said set of resonators comprises a first distributor switch having a number of contacts, each contact of which is connected to the output of only one of said resonators and wherein the means for producing a different predetermined D.C. voltage with the taking of each sample, comprises a second distributor switch, a potential divider, tappings on said potential divider in the contact path of said second distributor switch and means connecting the output from the first switch to said means responsive to an output of predetermined minimum voltage value.

9. A navigational aid as set forth in claim 6 wherein said set of resonators comprises a plurality of series connected coils which are connected to said means for feeding said detected Doppler frequencies, a plurality of resonant circuits corresponding in number to the series connected coils, each of said circuits being individually connected with one of said coils and each tuned to a different frequency lying within said expected band, separate rectifying means for each resonant circuit and fed therefrom and separate condensers for each resonant circuit and fed from said rectifying means, the arrangement being such that the junction of each rectifying means and its associated condenser forms the output of its resonator.

No references cited.